(12) United States Patent
Bruntveit et al.

(10) Patent No.: US 10,994,312 B2
(45) Date of Patent: May 4, 2021

(54) SOLIDS WASHING IN OIL AND/OR GAS PRODUCTION

(71) Applicant: Fourphase AS, Bergen (NO)

(72) Inventors: Jorgen Bruntveit, Bergen (NO); Karl Ole Lyngbo, Lepsoey (NO)

(73) Assignee: Fourphase AS, Bergen (NO)

( * ) Notice: Subject to any disclaimer, the term of this patent is extended or adjusted under 35 U.S.C. 154(b) by 404 days.

(21) Appl. No.: 16/097,659

(22) PCT Filed: May 5, 2017

(86) PCT No.: PCT/EP2017/060790
§ 371 (c)(1),
(2) Date: Oct. 30, 2018

(87) PCT Pub. No.: WO2017/191307
PCT Pub. Date: Nov. 9, 2017

(65) Prior Publication Data
US 2020/0324323 A1    Oct. 15, 2020

(30) Foreign Application Priority Data

May 5, 2016   (GB) .................................... 1607880

(51) Int. Cl.
| | |
|---|---|
| *B08B 3/04* | (2006.01) |
| *B08B 3/10* | (2006.01) |
| *B08B 13/00* | (2006.01) |
| *C10G 1/04* | (2006.01) |
| *E21B 43/34* | (2006.01) |

(Continued)

(52) U.S. Cl.
CPC ............ *B08B 3/04* (2013.01); *B01D 21/0024* (2013.01); *B03B 9/02* (2013.01); *B08B 3/106* (2013.01); *B08B 13/00* (2013.01); *C10G 1/047* (2013.01); *E21B 43/35* (2020.05)

(58) Field of Classification Search
None
See application file for complete search history.

(56) References Cited

U.S. PATENT DOCUMENTS

| | | | |
|---|---|---|---|
| 3,954,415 A | 5/1976 | Davitt | |
| 5,879,541 A * | 3/1999 | Parkinson | .......... B01D 21/2411 208/425 |

(Continued)

FOREIGN PATENT DOCUMENTS

| | | | |
|---|---|---|---|
| EP | 2082815 A1 | 7/2009 | |
| EP | 2082815 B1 * | 1/2016 | ............... B09C 1/00 |
| GB | 2529729 A | 3/2016 | |

(Continued)

OTHER PUBLICATIONS

Great Britain Combined Search and Examination Report under Sections 17 and 18(3) dated Dec. 12, 2016.

(Continued)

*Primary Examiner* — Michael E Barr
*Assistant Examiner* — Omair Chaudhri
(74) *Attorney, Agent, or Firm* — Polsinelli, PC

(57) ABSTRACT

An apparatus for washing solid particles removed from a hydrocarbon-containing fluid produced from an oil and gas production facility using a company automated unit. The apparatus comprises an inlet that carries a mixture of solids particles and water flushed from a de-sander.

24 Claims, 2 Drawing Sheets

(51) Int. Cl.
 *B03B 9/02* (2006.01)
 *B01D 21/00* (2006.01)

(56) References Cited

U.S. PATENT DOCUMENTS

2008/0111096 A1* 5/2008 Veltri .................... C10G 1/047
 252/60
2014/0216998 A1* 8/2014 Al-Hadhrami ......... B01D 17/12
 210/138

FOREIGN PATENT DOCUMENTS

| WO | 99 38617 | 8/1999 |
| WO | 99 42218 | 8/1999 |

OTHER PUBLICATIONS

International Search Report and Written Opinion in PCT/EP2017/060790, dated Jun. 8, 2017.

* cited by examiner

SOLIDS WASHING IN OIL AND/OR GAS PRODUCTION

FIELD OF THE INVENTION

The present invention relates to an apparatus for, and a method of, washing solid particles (usually sand) collected from a hydrocarbon-containing fluid produced from an oil and/or gas production facility. In particular, this invention relates to an apparatus and method for washing solid particles from a well or group of wells using an automated apparatus that monitors the cleanliness of the particles and ensures that the washed particles meet some predefined threshold (for example, regulatory limit) so that they can be safely disposed.

BACKGROUND

During the production of oil and gas large amounts of solids, for example, sand or chalk can be produced. The amount and type of solids can vary from reservoir to reservoir and from well to well. It can also vary during the life of the reservoir/well. For example, as the reservoir pressure decreases during production, the stress state of the matrix rock in the reservoir changes. Such changes can result in increased stress in the matrix so that mechanical failure can occur, resulting in larger amounts of solids production (e.g., sand). The original pressure in the reservoir supported the rock formation and when this is removed through production, the matrix itself has to support the weight of the formation above and this increase in stress state results in sand production.

As another example, Enhanced Oil Recovery (EOR) techniques such as water or gas injection can cause an increase in the amount of sand being swept into the production well. Whatever the mechanism, the production of sand (and other materials; note in this description, the term "sand" is intended to mean any type of produced solids) entrained in the oil and/or gas production flow can cause many issues for the operator (for example, oil company) of the reservoir. In particular, sand in the production will cause erosion in pipelines and downstream equipment. It can also result in clogging of process equipment, e.g., valves and pumps, resulting in higher maintenance costs and loss of production during this maintenance. As a result, it is important to remove the solid particles from the production stream as soon as possible in the production flow, that is, on the production platform or facility.

However, the solids removed from the flow will be coated with hydrocarbon and so will represent an environmental hazard if they are not disposed of correctly. Clearly they cannot be pumped directly into the sea, as such action would create unacceptable environmental damage.

In many cases solids particles removed from the production flow are collected and transported onshore for appropriate treatment and disposal. This is very costly, as it requires storage space on the platform for the collected solids and shipping costs to get the dirty solids onshore. Platform space comes at a premium and can cost US $100,000 per tonne of payload and US $25,000 per square meter of facility area. Other options include re-injecting the separated solids into another well; however, this is also a costly solution.

SUMMARY OF THE INVENTION

The present inventors have worked to establish technical solutions to the above restrictions associated with technology presently used in the industry or disclosed in the prior art.

The present invention provides an apparatus for washing solid particles collected from a hydrocarbon-containing fluid produced from an oil and/or gas production facility.

The present invention further provides a method of washing oil-coated solid particles collected from a hydrocarbon-containing fluid produced from an oil and/or gas production facility.

The preferred embodiment of the present invention accordingly provides an apparatus for washing solid particles removed from a hydrocarbon-containing fluid produced from an oil and gas production facility using a compact automated unit. The apparatus comprises an inlet that carries a mixture solids particles and water flushed from a de-sander. The de-sander is ideally a dynamic solids separator as disclosed in published patent application GB-A-2529729 but can be any other type of sand separator.

Preferably, the sand entering the unit collects in a vessel that is suspended in a frame where the suspension arms are instrumented to provide the weight of sand collected in the vessel. The measured weight can be read by a controller, which determines the amount of sand collected and displays the determined amount on a screen. Preferably, within the suspended vessel there is an arrangement of piping and nozzles that allow hot steam and/or hot water to be injected into the collected sand. The heated aqueous fluid, comprising steam and/or hot water, is typically at a temperature of from 50 to 350° C. The high temperature of the steam/hot water, strips the oil from the sand particles while the jetting nozzles agitate and stir the particle bed. Released oil floats to the top of the water in the vessel, leaving the washed sand in the vessel.

In addition to the piping with nozzles inside the vessel, there is also a fluidising flushing unit placed towards the bottom of the sand collection vessel. The fluidisation head has an inlet and an outlet. Water is injected into the fluidisation head inlet and a mixture of sand and water leaves through fluidisation head outlet. Preferably, the mixture of sand and water leaving the vessel enters a chamber in which a sensor is placed that measures the oil content of the water sand mix. The oil content measurement is read by the controller and can also be stored.

Preferably the chamber in which the oil content sensor is placed has two exits, each of which has one or more respective valves that can be independently and automatically opened and closed by the controller. A first exit is connected to a re-circulation pump that injects the sand/water mix into the inlet of the apparatus, and thus returns the sand into the vessel for further washing. The second exit from the chamber carries sufficiently cleaned solids particles out of the apparatus, which can be disposed of safely.

If the oil content measurement received by the controller is above a predefined threshold that has been previously established as being low enough to ensure sufficiently cleaned solids, then the controller will open the valve to the first exit and close the valve to the second exit so that the solids in the chamber are sent to, and recirculated back into the vessel from, the re-circulation pump. If, on the other hand, the oil content measurement is below the predefined threshold the controller will close the valve to the first exit and open the other to the second exit so that cleaned solids particles can leave the apparatus.

The oil that is stripped from the solids particles by the jetting stream in the vessel floats to the top of the vessel where it exits the apparatus with the water. Preferably the top of the vessel has several filter screens, which ensure that solids particles carried to the top of the vessel do not leave the vessel in the oil/water flow. Ideally, these screens are arranged such that coarser screens are placed at the bottom, on the inlet side of the filter screen assembly, with finer screens towards the top, on the outlet side of the filter screen assembly.

Ideally there is a safety pressure relief valve in the vessel that ensures that the pressure never gets above some predefined maximum safe operating limit. If the pressure comes close to this save limit, the valve opens automatically and vents (or relieves) the high pressure gas within the vessel to a safe area.

BRIEF DESCRIPTION OF THE DRAWINGS

Embodiments of the present invention will now be described in more detail by way of example only with reference to the accompanying drawings, in which.

In the figures, dashed lines represent measurement or electrical control lines and solid lines represent pipes or flow-lines.

DETAILED DESCRIPTION

Figure 1:
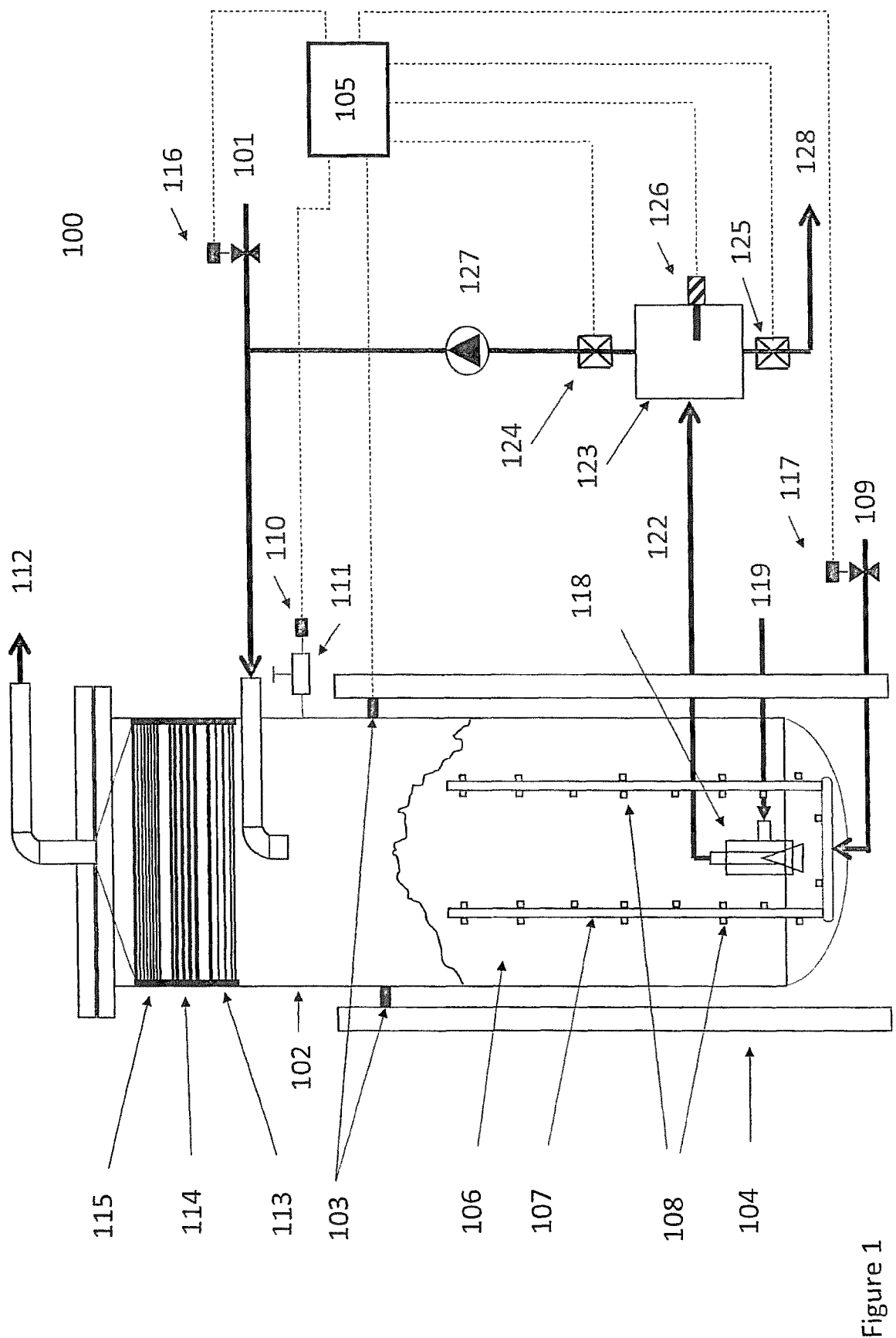
FIG. 1 schematically illustrates a side view of a solids particles washing system according to an embodiment of the present invention.

Referring to FIG. 1 there is shown a schematic of a solids particles washing system 100. The system comprises an inlet 101 that carries a sand/water mix from a de-sanding unit (not shown) into a vessel 102. The sand that enters through the inlet 101 will collect (through settlement) in the vessel to form a solids bed 106. The vessel is suspended on arms 103 within a frame 104. The arms 103 are instrumented with a weight sensor that is connected to a controller 105, which calculates the weight of sand collected in the vessel and can display this on a screen (not shown). The controller can use this information in other ways that will be described later. Within the vessel there exists piping 107 that has a plurality of nozzles, two of which nozzles are labelled 108 in FIG. 1. Those skilled in art will appreciate that the number of pipes and nozzles thereon can be adjusted to suit a particular configuration depending on, for example, the vessel size and volume of sand to be processed. The piping 107 therefore comprises a pipe assembly which comprises a plurality of tubes each having a plurality of the nozzles 108 thereon. Typically, at least one tube, or each tube, is substantially upright and linear. Alternatively, at least one tube, or each tube, is a coil. The piping 107 further comprises a common tube connecting the plurality of tubes, optionally the common tube having a plurality of the nozzles 108 thereon. The piping 107 is connected in fluid communication to a piping network located outside the vessel. The piping 107 has aqueous fluid, in the form of pressurised steam or water or a mixture thereof, flowing through the piping 107 and exiting the nozzles 108. Typically the nozzles 108 inject pressurised steam, which may contain some additional residual hot water at substantially the same temperature as the steam. The steam/water is injected through an inlet 109 of the piping network at a flow rate of, for example, 10 to 30 l/min and at a pressure of from 50 to 250 bar. The aqueous fluid, comprising pressurised steam or water or a mixture thereof, exiting the nozzles 108 is typically at a temperature of from 50 to 350° C. Typically pressurised steam is supplied at a temperature of from 100 to 350° C., and optionally comprising some additional residual hot water at substantially the same temperature as the steam. Alternatively, water is supplied at a temperature of from 50 to 100° C.

The pressure within the vessel itself should be maintained at a value that is not too high, for example, 10 bar and a pressure sensor 110 measures this pressure and is read by the controller 105. The controller can use this measurement to control flow into the vessel, e.g., the steam flow or water/sand input flow, to ensure the pressure does not exceed the predefined maximum vessel pressure, e.g., 10 bar. Choke valves 116 and 117 are connected to the controller to allow for automated control of these flows. Exit valves 124 and 125 can also be opened/closed by the controller. A fail-safe pressure relief valve 111 is also provided that will automatically vent the vessel pressure to a safe location if the vessel pressure increases above a predetermined safe limit.

The high temperature steam injected into the piping 107 and through the nozzles 108 will strip oil from the sand particles collected in the vessel. Additionally, the jetting of the steam through said nozzles will agitate the sand particle bed 106 resulting in continuous churning of the sand particles. Because the vessel is completely filled with water, the oil that is stripped off the sand particles will flow to the top of the vessel because of buoyancy due to the lower density of the oil compared to the water density. As a result, there is a continuous flow of water and oil through the vessel that exits at the top through exit 112.

At the top of the vessel there are shown three screens 113, 114 and 115 which act as filters to ensure that no sand particles exit the apparatus with the water/oil mix through the exit 112. The screens are arranged so that coarser filtering occurs at screen 113 than at screen 114 and finally screen 115 filters at the smallest particle size. Those skilled in the art will appreciate that the number and grade of screens filtering at each screen stage can be varied in order to optimise sand rejection depending on the configuration, sand particle size distribution, flow rates etc., and so can vary from implementation to implementation.

Figure 2:
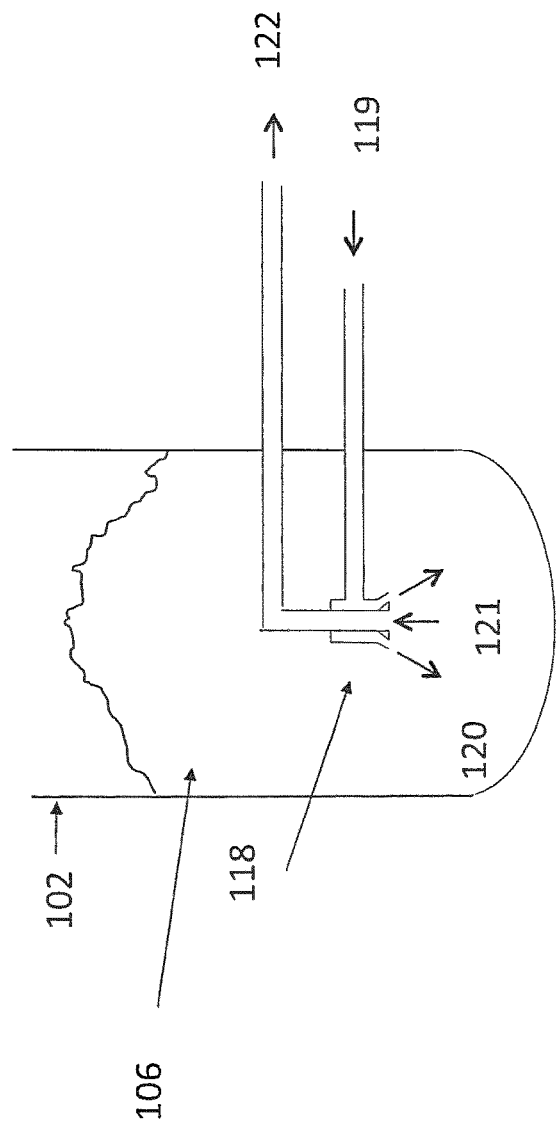
FIG. 2 shows a schematic of the sand fluidisation and flushing head in the apparatus of FIG. 1.

Once the volume of sand particles collected in the vessel is greater than some predetermined value, the flushing operation will be started. The controller can use the output from the weight sensors 103 to determine if this threshold has been passed and will then configure the system appropriately. Close to the bottom of the vessel there is positioned a flushing unit 118. A more detailed schematic of the flushing unit is also shown in FIG. 2.

During flushing, water is injected through the inlet 119 and is jetted though the nozzles in the flushing head 120. The number and sizes of these nozzles will be chosen depending on the operation requirements of the apparatus, e.g., sand collection rate, size of the vessel, etc. Water exiting through the nozzles 120 will fluidise the sand bed in the vicinity of the flushing head. As the pressure in the vessel is higher than outside, a mixture of water and sand particles is forced through the central pipe in the flushing head 121 and out of the vessel through exit pipe 122. This mixture enters a chamber 123 that has two exits, each of which has a respective valve 124, 125, which are connected to the controller 105. The chamber is also equipped with an oil content sensor 126. This sensor will measure the amount of oil that is in the mixture of water in sand in the chamber and is connected to the controller 105. There are many different commercially available sensor technologies that can be used for this measurement including spectroscopy and can measure very small amounts of oil (on the order of tens (10s) of ppm by volume), see for example, advancedsensors.co.uk and m-flow-tech.com. Any of these sensors would be suitable.

As the water/sand mixture enters the chamber its oil content is measured using sensor 126. If the quantity of oil is above a predetermined safe limit (that is generally dictated by environmental regulations) determined by the controller 105 then valve 124 remains open and 125 remains closed. The recirculation pump 127 will inject the mixture back into the vessel 102 through the inlet conduit 101. If on the other hand the oil content measurement has stabilised below the safe threshold value, the controller will open valve 125 and close valve 124. In this case the clean water and sand mix can exit through outlet conduit 128 and disposed of safely.

Flushing will continue until the quantity of sand in the vessel is reduced below some predetermined value. When this occurs the control will stop the flow of water into the flushing unit through inlet 119, switch off the circulation pump 127 and configure the valves so that valve 124 is open and valve 125 is closed.

The preferred embodiment of this invention includes a controller that automates the function of the apparatus as described above. However, in other embodiments the sensors outputs, valve and pump status can be displayed so that an operator can manually open/close valves, operate pumps etc., in order to achieve the same functionality. In other embodiments some elements of the functionality may be automated as above and others may be manually achieved in response to displayed sensor measurements.

Additional, it is preferred that the operation of the apparatus takes place in a batch mode, however, it could also be operated in a continuous mode. In batch mode the sequence would be:

1) Injection water/sand mixture from the de-sander through inlet 101 until the amount of sand collected in the vessel 102 reaches some threshold value.
2) Once this threshold is reached, stop the injection of water and sand into the vessel by choking the flow completely using choke 116.
3) Start a flushing cycle by injecting water into the flushing head through inlet 119 and recycle the water/sand mixture using recirculation pump 127. Continue circulating the mixture until the oil content in chamber 123 stabilises below a safe threshold. During this recycling process oil/water will exit the vessel through conduit 112.
4) When the oil content in chamber 123 is low enough, close valve 124 and open valve 125 thus flushing the cleaned water/sand mixture out of the apparatus through conduit 128. This flushing will continue until the quantity of sand in the vessel is below a predetermined value. At this point, the flushing cycle is stopped.
5) During these steps steam injection can be continuous through inlet 109 so that oil is stripped off the sand particles continuously.
6) Return to step 1.

In a continuous mode injection of water/sand through inlet 101 takes place all the time. Additionally flushing with recycling of water/sand using recirculation pump 127 or ejection of cleaned water/sand through outlet conduit 128, is also continuous. In this case, the controller will use the sensor measurements to control the pump rates and valves to ensure that the flow of water, oil contaminated sand and flushing water is balanced by the removal of water and oil through exit 112 and cleaned water and sand through conduit 128. Those skilled in the art will appreciate how such a controller can be programmed to achieve this. Using the apparatus and method of the preferred embodiment described herein, solids particles produced from a well or group of wells, can be washed by an automated compact unit to a level that allows for safe disposal. Additionally such a solids particles washing unit allows cleaned sand to be safely disposed of from the platform removing the need to store them on the platform and ship collected sand particle onshore for further treatment. This increases the overall efficiency of the production process and significantly reduces operational cost.

The present invention may be embodied in many different forms and should not be construed as being limited to the embodiments set forth herein; rather, these embodiments are provided so that this disclosure will be thorough and complete, and will fully convey the concept of the invention to those skilled in the art.

The invention claimed is:

1. An apparatus for washing solid particles collected from a hydrocarbon-containing fluid produced from an oil and/or gas production facility, the apparatus comprising:
   a vessel having a lower part defining a volume for collecting a bed of solid particles and an upper part defining an exit for liquid from the vessel,
   a pipe assembly located in the volume, the pipe assembly having a plurality of outlet nozzles located thereon,
   a pipe network connected to the pipe assembly and arranged to supply pressurised steam or water or a mixture thereof to the pipe assembly to cause the steam or water or a mixture thereof to exit the outlet nozzles into the volume, a fluidising flushing unit located in the volume, the fluidising flushing unit comprising a fluidisation head, an inlet for supplying fluidising liquid to the fluidisation head and an outlet for conveying a fluidised mixture of solid particles and fluidising liquid from the fluidisation head and out of the vessel,
   an oil content sensor connected to the outlet of the fluidising flushing unit, the oil content sensor being adapted to determine whether an oil content of the fluidised mixture or any constituent thereof is below a preset oil content threshold, the oil content sensor having a first exit communicating with a recirculation pump for recirculating the fluidised mixture back to the vessel and a second exit communicating with an outlet conduit for outputting the fluidised mixture; and
   a controller for selectively controlling the fluidised mixture into a recirculation flow through the recirculation pump or an output flow through the outlet conduit in response to the oil content determined by the oil content sensor.

2. An apparatus according to claim 1 wherein the controller is adapted to provide the recirculation flow through the recirculation pump when the oil content determined by the oil content sensor is not below the preset oil content threshold and to provide the output flow through the outlet conduit when the oil content determined by the oil content sensor is below the preset oil content threshold.

3. An apparatus according to claim 1 wherein the controller is adapted to open or close the first and second exits in response to the oil content determined by the oil content sensor, wherein each of the first and second exits has a respective valve and the controller is adapted to open or close the respective valve of the first and second exits in response to the oil content determined by the oil content sensor.

4. An apparatus according to claim 1 wherein the oil content sensor comprises a chamber connected to the outlet of the fluidising flushing unit and an oil content sensor for measuring oil content of the fluidised mixture in the chamber.

5. An apparatus according to claim 1 wherein the pipe assembly comprises a plurality of tubes each having a plurality of the nozzles thereon, wherein at least one tube is substantially upright and linear or wherein at least one tube is a coil.

6. An apparatus according to claim 5 wherein the pipe assembly further comprises a common tube connecting the plurality of tubes, the common tube having a plurality of the nozzles thereon.

7. An apparatus according to claim 1 further comprising a weighing device for weighing, directly or indirectly, the amount of solid particles in the vessel, wherein the controller is adapted to control the fluidising flushing unit to supply fluidising liquid to the fluidisation head when the weight of solid particles is above a preset threshold.

8. An apparatus according to claim 1 further comprising a solid particle filter system located at the exit for liquids from the vessel, wherein the solid particle filter system comprises a serial array of particle filters of progressively decreasing mesh size towards the exit.

9. An apparatus according to claim 1 further comprising an input conduit connected to the upper part for supplying a fluidised flow of the solid particles to be washed into the vessel, wherein the recirculation pump is in a recirculation conduit which communicates with the input conduit to supply the recirculated fluidised mixture into the input conduit.

10. A method of washing oil-coated solid particles collected from a hydrocarbon-containing fluid produced from an oil and/or gas production facility, the method comprising the steps of:
(i) providing a vessel having a lower part defining a volume for collecting a bed of solid particles and an upper part defining an exit for liquid from the vessel,
(ii) supplying a fluidised flow of solid particles into the vessel to provide a bed of solid particles in the volume and liquid above the bed of solid particles, at least some of the solid particles being at least partly coated with oil,
(iii) supplying pressurised steam or water or a mixture thereof into the body of solid particles from a plurality of outlet nozzles located on a pipe assembly located in the volume, the steam or water or a mixture thereof causing at least partial removal of oil from the oil-coated solid particles and mechanical agitation of the particles in the bed, to form a liquid mixture of oil and water above the bed,
(iv) supplying a fluidising liquid to the bed to convey a fluidised mixture of solid particles from the bed and fluidising liquid out of the vessel,
(v) determining whether an oil content of the fluidised mixture or any constituent thereof is below a preset oil content threshold, the oil content being determined by an oil content sensor coupled to an outlet for the fluidising liquid conveyed out of the vessel, and
(vi) selectively recirculating the fluidised mixture back to the vessel or outputting the fluidised mixture to an outlet conduit in response to the determined oil content.

11. A method according to claim 10 wherein the pressurised steam or water or a mixture thereof is supplied at a temperature of from 50 to 350° C., wherein pressurised steam is supplied at a temperature of from 100 to 350° C. and/or water is supplied at a temperature of from 50 to 100° C.

12. A method according to claim 10 wherein the pressurised steam or water or a mixture thereof is injected at a pressure of from 50 to 250 bar.

13. A method according to claim 10 wherein the pressurised steam or water or a mixture thereof is injected at a flow rate of 10 to 30 l/min.

14. A method according to claim 10 wherein a recirculation flow is provided when the oil content determined by the oil content sensor is not below a preset oil content threshold and an output flow through the outlet conduit is provided when the oil content determined by the oil content sensor is below the preset oil content threshold.

15. A method according to claim 10 wherein the oil content sensor has a first exit communicating with a recirculation pump for recirculating the fluidised mixture back to the vessel and a second exit communicating with the outlet conduit for outputting the fluidised mixture, and a controller opens or closes the first and second exits in response to the oil content determined by the oil content sensor.

16. A method according to claim 10 further comprising the steps of: (vii) weighing, directly or indirectly, the amount of solid particles in the vessel, and (viii) supplying the fluidising liquid to the bed of solid particles when the weight of solid particles is above a preset threshold.

17. A method according to claim 10 further comprising the steps of: (ix) flowing the mixture of oil and water above the bed through the exit of the vessel, and (x) filtering the mixture of oil and water flowing through the exit of the vessel using a solid particle filter system located at the exit of the vessel.

18. A method according to claim 17 wherein the solid particle filter system comprises a serial array of particle filters of progressively decreasing mesh size towards the exit of the vessel so that progressively smaller particle sizes are filtered by the solid particle filter system.

19. A method according to claim 10 wherein a fluidised flow of the solid particles to be washed is supplied into the vessel by an input conduit connected to the upper part of the vessel.

20. A method according to claim 10 wherein the solid particles comprise sand.

21. A method according to claim 10 wherein during at least steps (iii) and (iv) the vessel is substantially filled with the solid particles in the bed and the liquid mixture of oil and water above the bed, and the liquid mixture of oil and water above the bed has an uppermost layer of oil floating on water.

22. A method according to claim 21 further comprising the step of:
(xi) skimming off the uppermost layer of oil floating on the water.

23. A method according to claim 10 wherein steps (ii) and (iii) are carried out in a continuous process and step (iv) is carried out continuously or carried out intermittently dependent upon a minimum weight of solid particles in the bed.

24. A method according to claim 10 wherein steps (ii), (iii) and (iv) are carried out intermittently in a batch process dependent upon a minimum weight of solid particles in the bed.

* * * * *